Patented May 15, 1951

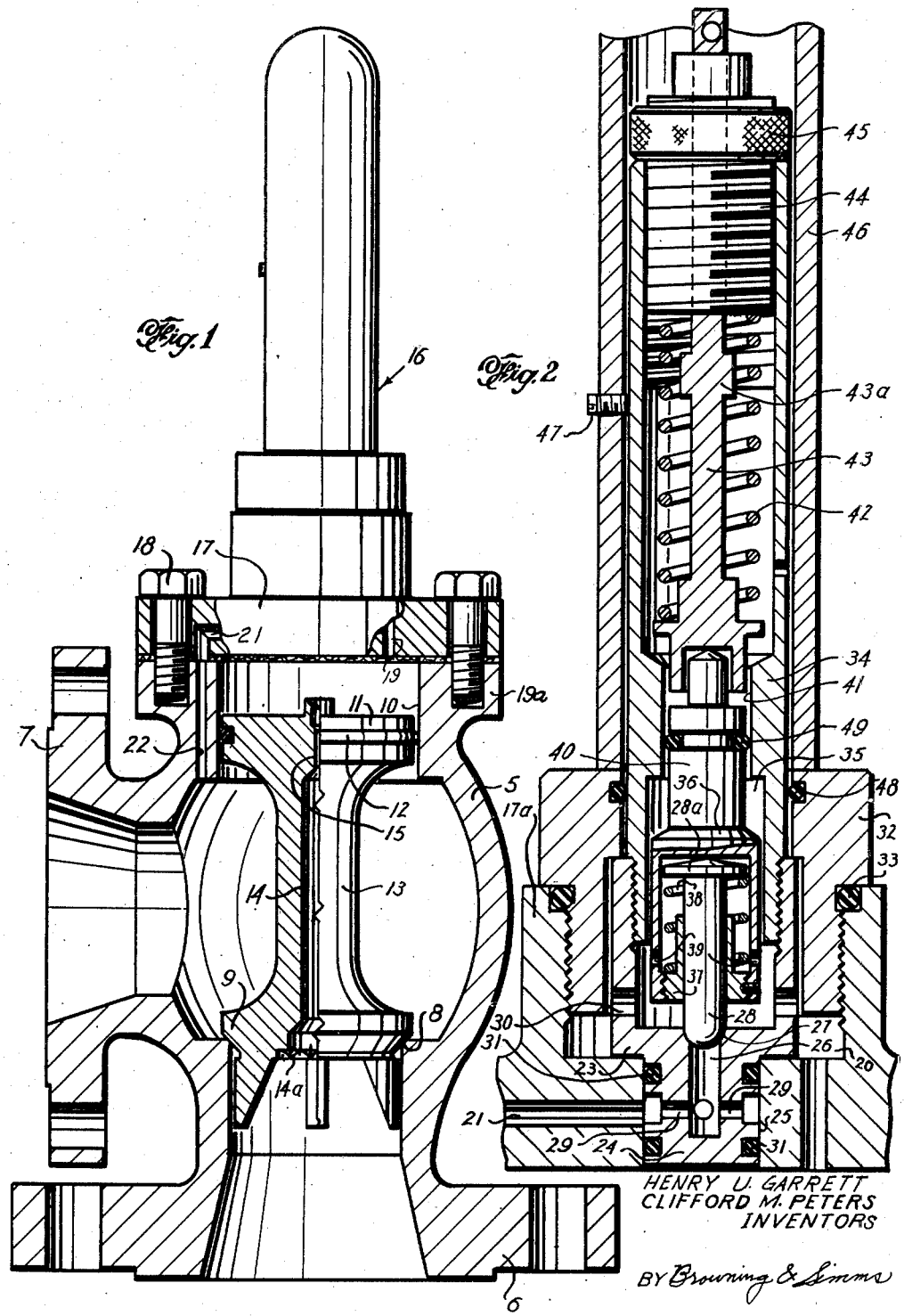

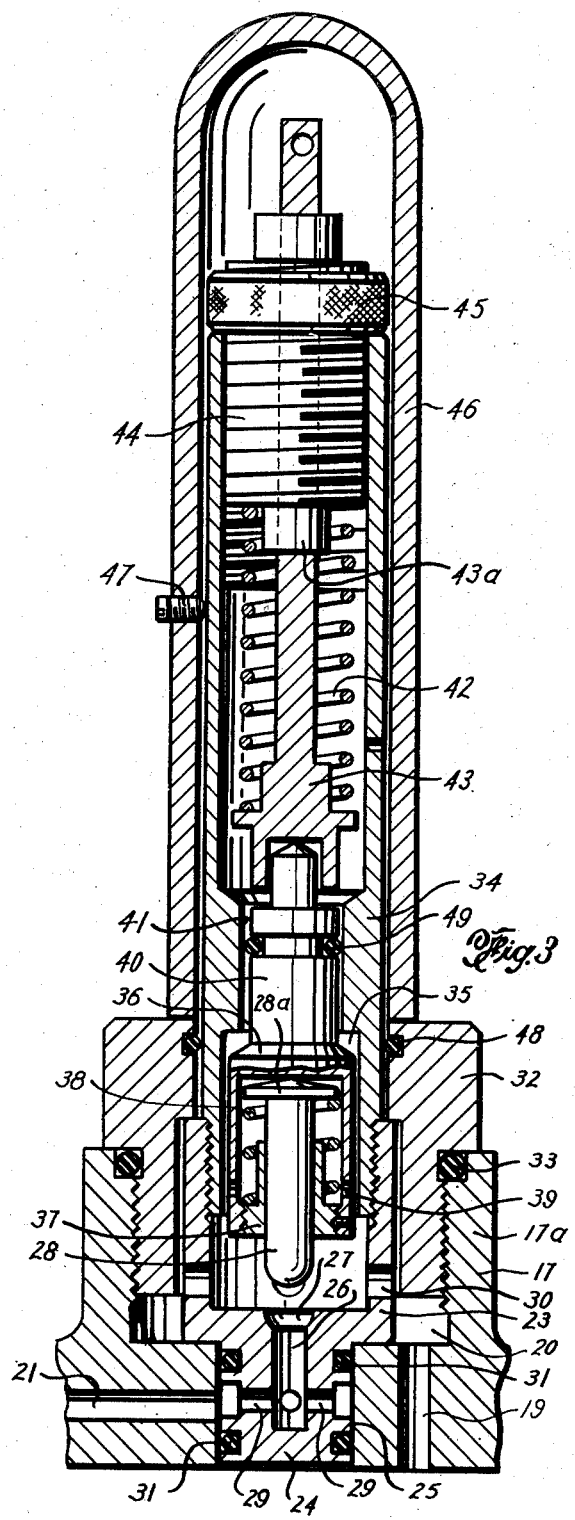

2,552,892

UNITED STATES PATENT OFFICE 2,552,892

PRESSURE RESPONSIVE VALVE

Henry U. Garrett and Clifford M. Peters, Houston, Tex.

Application February 7, 1949, Serial No. 74,875

3 Claims. (Cl. 137—53)

This invention relates to improvements in pressure responsive valves and refers more particularly to pressure responsive valves in which the fluid to be controlled provides the motive power for actuating the control mechanism. The valves may be used in pressure systems involving gases, liquids or mixtures of the two.

In many pressure installations, such as on pipe lines, pressure vessels and the like, it is desirable to employ either a pressure relief valve or a back pressure valve which is responsive to the pressure controlled. This has been satisfactorily accomplished with electrically actuated control mechanisms but such installations are expensive and are not always feasible. For this reason, it is desirable to provide a valve which will act positively without any chattering or throttling to open and close the conduit for the fluid which is controlled by pressure actuated mechanism.

An object of this invention is to provide a device which may be used as a pressure relief valve or a combination regulator and back pressure valve, which will positively open and close dependent upon the magnitude of the pressure of the fluid to be controlled.

Another object is to provide a pressure responsive valve in which the control mechanism is positive in action and will not throttle or chatter, but is pressure actuated.

A further object is the provision as a sub-combination a pressure relief valve which will positively open upon occurrence of a predetermined pressure condition for a finite time period and will then close and remain closed until reoccurrence of such predetermined pressure condition.

Other and further objects of this invention will appear from the description.

In the accompanying drawings which form a part of the instant specification, are to be read in conjunction therewith, and wherein like reference numerals are employed to designate like parts in the various views:

Fig. 1 is an elevational view partially in section of apparatus constituting an embodiment of this invention;

Fig. 2 is an elevational view upon an enlarged scale, showing in section the control mechanism of the apparatus shown in Fig. 1 with the parts in closed position; and Fig. 3 is a sectional view of the control mechanism shown in Fig. 2 but illustrating the mechanism in open position.

The device of this invention may be used as a relief valve or as a combination regulator and back pressure valve and comprises in general a conduit with a seat therein and a main valve element to control the flow through the conduit; an actuating mechanism motivated bp the pressure of the fluid controlled; and a control mechanism for the actuating mechanism, which is also responsive to and motivated by the pressure of the fluid controlled.

In the drawings, a casing means for the main valve member is shown in the form of a T-fitting 5 having a flanged inlet fitting 6 and a flanged outlet fitting 7. The fitting 6 may be secured to any pressure vessel, as for example a pipe line, tank or the like. Fitting 7 may be fitted to any suitable receptacle for the fluid that will pass through the conduit provided by the casing between fittings 6 and 7. In order to control flow through this conduit, a valve seat 8 is provided against which valve member 9 is adapted to seat. The valve 9 is urged from its seat by the pressure differential across the valve member when seated.

A pressure actuated means is provided for operating the valve member and holding it against the seat 8, in which the pressure of the fluid to be controlled is utilized as the motive force. This mechanism includes a pressure chamber provided by the cylindrical wall or bore 10 in the third arm of the T-fitting. A pressure responsive member 11, which may be a piston having a suitable sliding seal with the wall of bore 10 in the form of an O-ring 12 carried by a peripheral groove in the piston, has a pressure face exposed interiorly of the chamber, of greater effective area than is the pressure face of valve member 9 residing within seat 8. The pressure responsive member is connected to the valve member 9 so that movement of the pressure responsive member is reflected by like movement of the valve member.

To supply motive fluid for the pressure responsive member, a means for pressurizing the pressure chamber with the pressure of the fluid to be controlled is provided. This may be accomplished by providing the connection between the pressure responsive member and valve member 9 in the form of a rod 13 having an axial passage 14 therethrough. A screen 14a at the entrance of the passage catches debris. A constriction, which may be a narrow diameter portion 15 of the passage, is provided to restrict the rate of flow of pressure fluid from the conduit upstream of the valve seat into the pressure chamber. With this arrangement, the pressure of the fluid controlled is exerted against the large area face of the pressure responsive member to positively hold valve member 9 closed as long as the pressure within the pressure chamber is as great as the pressure of the fluid controlled.

It is contemplated that an adjustable choke or needle valve arrangement may be employed in place of the restricted passageway 15 for determining the rate of supply of pressure fluid to the pressure chamber.

A pressure actuated control mechanism is provided for relieving the pressure within the pressure chamber rapidly and positively upon occurrence of a predetermined pressure within the conduit upstream from seat 8. The arrangement of this pressure actuated control mechanism is such that a valve controls a vent for the chamber in such fashion that the valve element is snapped to full open position once the pressure of the fluid controlled reaches a predetermined value. This snap action prevents throttling or chattering of the valve and provides an arrangement whereby the relief valve 9 is opened for a definite finite time period and is then positively closed again.

This control mechanism is shown generally at 16 in Fig. 1 and is detailed in Figs. 2 and 3 in closed and opened positions respectively.

The control mechanism includes a flanged fitting 17 that is secured by suitable studs 18 to flange 19a of the T-fitting. A suitable gasket may be employed between flanges 17 and 19 to seal the joint. Flange 17 has a passage 19 therein which communicates between the pressure chamber within bore 10 of the T-fitting and a recess 20 provided by the upstanding boss portion 17a of the fitting. The passage 19 and socket 20 provide a part of the vent for relieving the pressure within the pressure chamber of bore 10. The outlet for this vent is provided by the angular passage 21 formed in flanged member 17 which communicates with a passage 22 in the T-fitting. A pressure actuated relief valve or control mechanism is interposed between the portions 19 and 21 of the vent passage and is adapted to maintain the passage closed during normal operation except when the pressure to be controlled exceeds a predetermined value.

This control mechanism includes a cage member 23 carrying a seat 27 and having a portion 24 fitting in a central opening 25 in fitting 17. This portion 24 has an axial bore 26 extending about half through the portion 24. At the upper end of this passage is a seat 27 in which the valve element 28 is adapted to seat as will be hereinafter more fully explained. The bore 26 communicates with a plurality of radially extending openings 29, the outer ends of which are included in an annular peripheral groove adapted to communicate with bore 21. It is seen that this arrangement, together with radial ports 30 and the upstanding portion of part 23, completes the vent passage for the pressure chamber. The portion 24 should have seals in the joint between the member 17 above and below the annular groove which communicates with passage 21. O-rings 31 in peripheral grooves in 24 are suitable for this purpose.

Cage part 23 is held in place by nut 32 threaded to the boss 17a of fitting 17. A seal for this threaded joint may be provided in the form of an O-ring 33 disposed between the parts.

The control mechanism for the valve element 28 is supported within a tubular part 34, the lower end of which is threaded to part 23 and which has a seal between nut 32 and its outer periphery provided by O-ring 48. At its lower end, tubular part 34 has an enlarged socket 35 which houses a valve cage 36 within which valve element 28 is movably mounted. The cage 36 has an inner chamber which houses the main stem of valve element 28, a nut 37 threaded to the cage member holding the valve element in place. A resilient element, which may be a relatively weak coil spring 38, extends between nut 37 and the head 28a on the upper end of valve element 28 urging the valve element upward.

The interior of cage 36 communicates with the interior of cage portion 23 through ports 39. With this arrangement, a limited relative movement between the cage 36 and valve element 28 is permitted when the pressure differential across the seated valve element is sufficient to hold it in place while the valve cage is moved upwardly or downwardly in response to the pressure responsive mechanism to be next described. However, the upstanding portion or cylindrical guide of nut 37 will engage the head portion of valve element 28, when the cage 36 is forced upwardly in response to the pressure controlled a predetermined amount to crack the valve element from its seat. When this occurs, weak spring 38 will snap the valve element to full open position, as shown in Fig. 3. Abutment of the head of the valve on the upper surface of the interior of the valve cage 36, as also shown in Fig. 3, limits relative movement between the valve and cage in the other direction.

The pressure responsive mechanism for controlling the valve includes a pressure responsive member which may be a plunger or piston 40 having a sliding seal within a cylindrical portion 41 of the tubular part 34. This plunger 40 is connected to cage 36 and may be integral therewith. Thus the pressure responsive member 40 has a connection with the valve element 28 which permits relative movement therebetween within limits.

Opposing movement of the plunger 40 under the influence of the pressure to be controlled, which, of course, has free access to the underside of the plunger as shown in Figs. 2 and 3, is a resilient means which resists movement of the plunger with a determined force. This resilient element may be a bellows charged with a predetermined pressure or a coil spring shown at 42. The spring 42 abuts the upper surface of an external flange on guide member 43 and the other end of the spring engages a nut 44 which is threaded into the upper end of part 34. This nut 44 has an axial bore therethrough, shown in dotted lines in Figs. 2 and 3, through which the guide portion of stem 43 is free to slide until head 43a of the stem abuts the underside of nut 44. This maintains the guide 43 in proper axial alignment and limits movement of plunger 40. The nut 44 has a knurled portion 45 facilitating axial adjustment of the nut within the threaded portion of part 34 to adjust the compressive tension on spring 42. This mechanism is housed within dome 46 which may be secured to part 34 by a set screw 47 or other suitable means. The dome 46 plays no part except to keep dust and other debris from the mechanism and to prevent tampering therewith.

The part 34 has a seal exteriorly thereof with part 32 in the form of an O-ring 48 positioned therebetween and the O-ring carried by plunger 40, shown at 49, provides a seal between the plunger and the cylindrical portion 41 of the tubular part 34. With this arrangement, there is no escape of pressure fluid from the interior of the control mechanism, but the plunger 40, at its end adjacent the engagement with head 43 of the guide, is exposed to atmospheric pressure and the pressure differential across the plunger, due to the pressure controlled, urges the plunger toward an upward direction, but this is opposed by the resilient element 42. Thus, unless the force of the pressure across the area of the O-ring 49 is greater than the tension of spring 42, the spring will maintain the plunger in its lower position shown in Fig. 2 with valve element 28 seated to close the vent. An increase in the pressure controlled obviously will increase the force tending to raise plunger 49 to permit unseating of valve element 28 to vent the pressure chamber within bore 10.

In operation, assuming that the device is to be employed as a relief valve to open in the event excessive pressure occurs within the pressure vessel to which flange member 6 is secured, the flanged fitting 7 will be either open to the atmosphere or will connect into some suitable low pressure vessel, pipeline or the like. It is apparent that the outlet opening past seat 8 may be of large area as well as the opening through fitting 7 to provide for a large volume of flow in order to quickly relieve the pressure within the pressure system to be protected. Nevertheless, the arrangement is such that valve 9 will remain positively seated against seat 8 to prevent escape of fluid from the pressure system until the pressure within the system exceeds some predetermined value.

The pressure of fluid within the system to be protected is reflected in the pressure chamber above piston 11 in bore 10 of the T-fitting for the fluid may pass through the restricted axial passage through connector 13. This pressure chamber within bore 10 also communicates through passage 19 with the socket 20, through the large ports 30 with te interior of cage member 23 and through the ports 39 with the interior of valve cage 36. However, the seated valve element 28 closes seat 27 to prevent escape of pressure fluid through passages 21 and 22 into the low pressure with which fitting 7 communicates. The pressure controlled also acts against the pressure responsive member 40 due to the loose fit of cage 36 within part 34 except at the seal between the plunger 40 ahd the cylinder 41. Thus the plunger is subjected to the positive pressure differential between atmosphere and the pressure within bore 10.

When the pressure within the pressure system increases, so will the pressure acting against the pressure responsive member 40 increase. When the force of this pressure against the pressure responsive member overcomes the force of spring 42, the pressure responsive member will commence to rise but the valve element 28 will not be unseated until the upper edge of nut 37 engages the underside of the head of the valve element. Of course, instead of providing an upstanding part upon the nut 37 for engaging this head, the spring 38 may be made stronger so that after predetermined collasping of the spring 38, the valve element will be lifted off its seat. In either event, the valve element 28, when once lifted off its seat, will snap under the force of spring 38 to full open position. This is true because the pressure across the valve element will substantially equalize when it is cracked from its seat. Obviously, the pressure at which the valve element 28 will be forced from its seat can be adjusted by rotating nut 44 so as to vary the axial position thereof in the tubular part 34.

When the valve element 28 is lifted from its seat, the pressure within the pressure chamber to which pressure responsive member 11 is subjected, will be quickly dissipated or reduced because the cross-sectional diameter of the flow passages including ports 19, 30, 26, 29, 21 and 22 are all greater than the cross-sectional flow through the restricted portion 15 of the passage which supplies the pressure fluid to the pressure chamber. When this occurs, the force holding the valve 9 seated, due to the force of pressure against the effective pressure surface of piston 11, is materally reduced and the force of the pressure to be controlled acting against the area of valve 9 residing within seat 8, urges the valve member and pressure responsive member 11 upwardly with a positive action. This provides a large area opening for relief of pressure from the pressure system and this will remain open for a definite finite time period.

The main valve 9 will recede automatically at the expiration of a finite time period because the pressure that urges plunger 40 against spring 42 is relieved at the same time that the pressure within bore 10 is relieved and spring 42 will urge the plunger 40 to its lower position. As soon as the pressure in the chamber 35 has dropped enough, the valve element 28 will seat, and since as the element 28 approaches its seat there is a pressure area on its lower end on which the pressure will be reduced, this element will make its final move toward its seat with a snap action. However, the described operation takes some time because the plunger 40 has to travel an appreciable distance and this provides ample time for relieving the pressure acting against piston 11. The pressure within bore 10 above piston 11 will begin to build up as soon as the valve element 28 seats but will build up slowly due to the restriction 15, but when this pressure has built up to substantially equal the pressure within the pressure system, the valve 9 will be forced closed with a positive action even though the pressure at the entrance to the main valve has not been substantially lowered. The valve will remain closed then until the pressure within the system again exceeds the predetermined limit. If the period of opening, just described, is not sufficient to reduce the pressure within the pressure system below the predetermined limit, then the operation just described will be immediately repeated to further relieve the pressure system and this cycle will continue until the pressure within the system has been sufficiently reduced.

It is also contemplated that this device may be employed as a back pressure valve and regulator usable, for example, in gas systems where gas from a well is to be introduced into a main trunk or gathering line or the like. Also, this may be employed for the same purpose where oil or other liquids or fluids are to be passed into a high pressure system.

In such installations, it is desirable to place a device in the line leading into the high pressure system which will close the line in the event the pressure within the line controlled should fall below the pressure existent within the main line or high pressure receptacle. The fitting 7 is connected to the high pressure receptacle and the fitting 6 is connected to the source of material to be injected into the pressure system or trunk line. The spring 42 is adjusted so as to force the plunger 40 downwardly to seated position in the event the pressure of the fluid to be injected into the pressurized system falls below the pressure normally occurring in the system. Of course, some arbitrary safety factor may be involved, for instance, the spring may be set to close the valve at a pressure somewhat above the pressure of the trunk line or pressure system.

With this arrangement, as long as the pressure of the system for communicating with fitting 6 is greater than the pressure of the system communicating with fitting 7 the plunger 40 will be maintained in a raised position as shown in Fig. 3 and valve element 28 will be unseated. Thus the pressure across piston 11 will be substantially equalized and the flow of fluid will maintain the valve member 9 off its seat. However, should the pressure of the system to which fitting 6 is connected fall below the pressure of the other system, a reversed direction of flow would take place causing valve member 9 to become seated against seat 8. This condition would prevail until the pressure within the system communicating with fitting 6 again rises sufficiently high to force plunger 40 to its full raised position with enlargement 43a of stem 43 abutting nut 44.

This regulator arrangement will work in this fashion only as long as the pressure or flow characteristics of the system with which fitting 7 communicates is sufficiently great so as to maintain a very slight pressure drop in the casing means 5 while fluid flows therethrough. Otherwise, the device will revert back to its pressure relief operation.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a pressure actuated valve having a conduit portion with a seat therein and a valve member associated therewith to control the flow and adapted to be unseated by the pressure of the fluid controlled, a means having a pressure responsive member of greater effective area than that of the valve member, a conduit providing a restricted passage connecting said pressure responsive member with the interior of the conduit controlled on the side of the seat remote from the valve member, a connection between the valve member and the pressure responsive member whereby the latter, under the influence of pressure exerted through said restricted passage, urges the valve member toward the seat, and a pressure actuated pilot valve mechanism responsive to the pressure acting on said pressure responsive member and controlling a larger relief passage adapted to relieve the pressure exerted on the pressure responsive member for a finite period, said mechanism including a valve element held against its seat by the pressure exerted on the pressure responsive member, a second pressure responsive member subjected to the same pressure as that to which the pilot valve element is subjected operably connected with the pilot valve element to unseat it when the controlled pressure exceeds a predetermined value, and a resilient element urging the pilot valve element to full open position.

2. In a pressure responsive valve having a flow conduit with a seat and an associated main valve member controlling same, a pressure chamber with a restricted flow connection with the conduit upstream of the seat, a pressure responsive member with its pressure face residing within the chamber, said pressure face of greater diameter than the face of the valve member within the seat, a connection between the valve member and pressure responsive member such that the pressure responsive member urges the valve toward its seat under the influence of the pressure within the chamber, vent for relieving the pressure within this pressure chamber, a pressure relief means controlling the vent in response to the pressure within the chamber including a valve element and seat controlling the vent, the pressure within the chamber urging the valve element toward its seat, a second pressure responsive member exposed to the pressure within the chamber and movably connected with the valve element within limits, adapted to seat the element at one limit and to unseat the element at the other limit, and a resilient means for moving the valve element to full unseated position with a snap action when raised off its seat.

3. In a pressure actuated valve having casing means providing a passage with a seat therein, a valve member adapted to seat thereon against the normal flow through the passage, a pressure chamber with a pressure responsive chamber therein of greater effective area than that of the valve member, a connection between the pressure responsive member and the valve member whereby the pressure within the chamber is operable through the pressure responsive member to urge the valve member toward seated position, and means for pressurizing the pressure chamber at a predetermined rate with the pressure fluid controlled by the valve member and seat, the improvement which resides in the combination therewith of means for relieving the pressure within the pressure chamber when the pressure of the fluid controlled exceeds a predetermined value including a vent port for the pressure chamber, a pilot valve element held seated therein by the pressure differential thereacross, a second pressure responsive member exposed to the pressure of the fluid to which the pilot valve element is subjected and a connection between the pilot valve element and second pressure responsive member adapted to move the valve element to full open position with a snap action when the second pressure responsive member is moved to a predetermined position.

HENRY U. GARRETT.
CLIFFORD M. PETERS.

REFERENCES CITED

The following references are of record in the file of this patent:

UNITED STATES PATENTS

| Number | Name | Date |
|--------|------|------|
| 934,083 | Mills | Sept. 14, 1909 |
| 1,660,382 | Hopkins | Feb. 28, 1928 |
| 1,922,928 | Cane | Aug. 15, 1933 |
| 2,091,596 | Klufpel | Aug. 31, 1937 |
| 2,127,293 | Gilman | Aug. 16, 1938 |
| 2,351,871 | Parker | June 20, 1944 |